United States Patent [19]

Liljequist et al.

[11] Patent Number: 4,520,986
[45] Date of Patent: Jun. 4, 1985

[54] SUSPENDED SEAT ASSEMBLY

[75] Inventors: Lawrence A. Liljequist, Chesterland; John E. Wible, Painesville; Richard A. Schwehr, Mentor, all of Ohio

[73] Assignee: Towmotor Corporation, Mentor, Ohio

[21] Appl. No.: 456,686

[22] Filed: Jan. 10, 1983

[51] Int. Cl.³ ............................................ F16M 13/00
[52] U.S. Cl. .................................. 248/585; 248/419; 248/421; 297/346
[58] Field of Search ............... 248/585, 421, 419, 157, 248/394, 395, 396, 397; 297/281, 282, 345, 346

[56] References Cited

U.S. PATENT DOCUMENTS

| 2,292,618 | 8/1942 | Davis | 248/421 X |
|---|---|---|---|
| 2,714,001 | 7/1955 | Hersey . | |
| 2,834,396 | 5/1958 | Herider . | |
| 2,953,191 | 9/1960 | Brendel | 248/585 X |
| 3,049,330 | 8/1962 | Coons et al. . | |
| 3,109,622 | 11/1963 | Heyl, Jr. . | |
| 3,137,473 | 6/1964 | Augunas . | |
| 3,298,654 | 1/1967 | Dome | 248/585 X |
| 3,724,797 | 4/1973 | Freitag et al. | 248/421 X |
| 3,894,708 | 7/1975 | Stanley | 248/421 X |
| 4,043,529 | 8/1977 | Pickles | 248/608 X |
| 4,047,759 | 9/1977 | Koscinski | 297/346 |
| 4,209,158 | 6/1980 | Pickles | 248/421 |

FOREIGN PATENT DOCUMENTS

| 2429497 | 1/1976 | Fed. Rep. of Germany . | |
|---|---|---|---|
| 2210954 | 6/1980 | France . | |
| 138229 | 10/1979 | Japan | 248/585 |

Primary Examiner—J. Franklin Foss
Assistant Examiner—David L. Talbott
Attorney, Agent, or Firm—Alan J. Hickman

[57] ABSTRACT

This invention relates to a suspended seat assembly (10) which eliminates the problems of excessive elevational movement and limited field of use, harsh ride, inability to accommodate a broad range of occupant weights, bulkiness, wear and premature failure, and difficult adjustment. The suspended seat assembly has a seat frame (12), a support frame (14), a connecting apparatus (42) which pivotally connects the seat frame (12) to the support frame (14) and permits movement of the seat frame (12) between a first position (38) above the support frame (14), past the support frame (14), to a second position (40) below the support frame (14), a tie apparatus (66) which maintains the seat frame (12) at a preselected attitude relative to the support frame (14), and a biasing arrangement (74) for biasing the connecting apparatus (42) and urging the seat frame (12) to the first position (38). Thus, the suspended seat assembly (10) useable in vehicle (34) applications wherein low overhead requirements are required, improves ride, accommodates a broad range of occupant weight, is compact, easy to adjust and has improved life. The suspended seat assembly (10) is particularly useful in a material handling vehicle (34).

18 Claims, 3 Drawing Figures

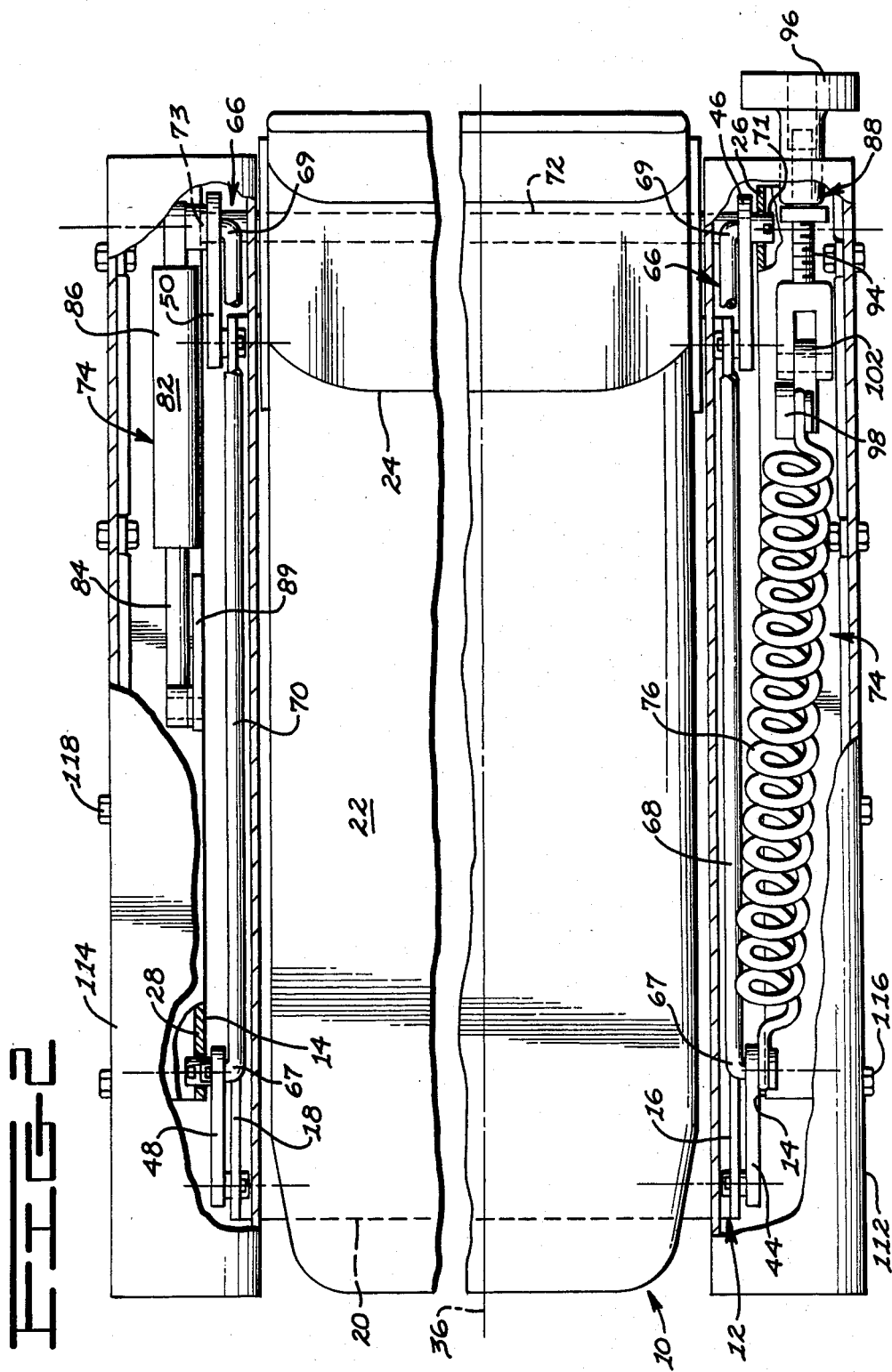

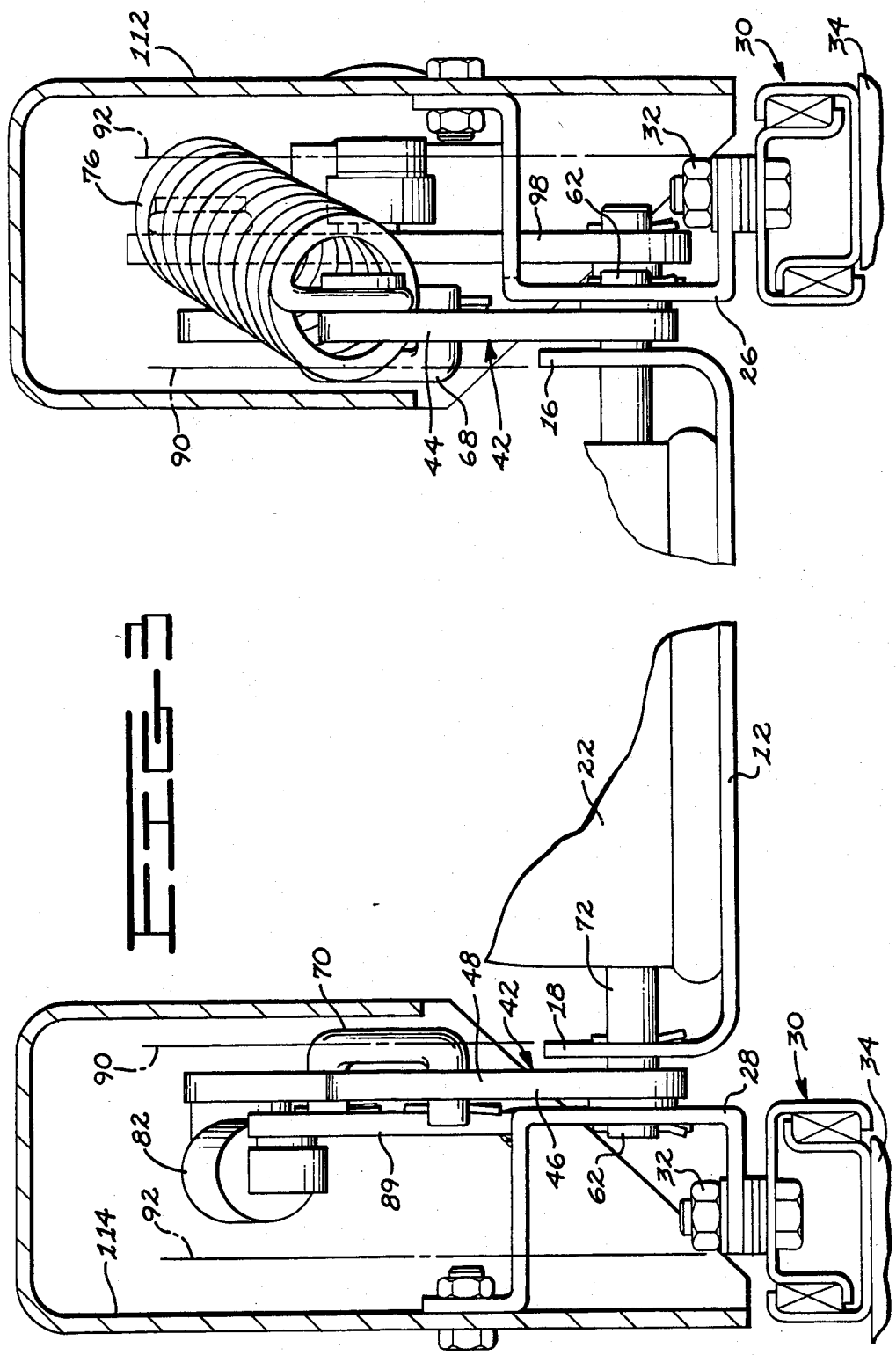

SUSPENDED SEAT ASSEMBLY

DESCRIPTION

1. Technical Field

This invention relates to a suspended seat assembly and more particularly to a compact suspended seat assembly having reduced elevational space requirements.

2. Background Art

Suspended seat assemblies suitable for use on a vehicle, for example a lift truck, earthmover and the like have been proven superior in both ride and comfort as compared to a standard seat assembly of the non-suspended type. However, use of seat assemblies of the suspended type has been limited due to the substantial amount of elevational travel of the seat between a fully raised position and a fully lowered position. This is particularly true in vehicles wherein an overhead structure such as a cab or overhead guard is provided. Usually, the overhead structure is at preselected maximum distance from the ground upon which the vehicle operates, thus preventing an increase in the height of the overhead structure and the distance between the seat and the overhead structure. Therefore, inadequate clearance between the head of the vehicle operator and the overhead structure prevents the use of existing suspended seat assemblies.

Typical suspended seat assemblies as discussed above are disclosed in U.S. Pat. Nos. 2,714,001 to A. J. Hersey et al, dated July 26, 1955; 2,834,396 to E. A. Herider et al, dated May 13, 1958; 3,049,330 to R. R. Coons et al, dated Aug. 14, 1962; 3,137,473 to A. G. Augunas dated June 16, 1964; and 4,047,759 to D. P. Koscinski dated Sept. 13, 1977. These seat assemblies all have a common deficiency in that at least one member of the suspension system, i.e. link, spring, or cylinder is connected to the seat frame and support frame at a location which interferes with the seat frame and prevents it from passing the support frame. Thus, in order for the suspension system to perform in an optimum manner the seat frame must be spaced a greater distance from and above the support frame than desired.

The range of occupant weight which the suspension seat assembly is to accommodate is related to the suspension spring rate, the linkage geometry, and the amount of elevational travel of the seat assembly. Usually, the greater the amount of elevational seat assembly movement the broader the weight range capacity. This is due to the spring being stretched or compressed a greater amount when seat travel is large. Therefore, prior art designs required a large amount of elevational movement of the seat assembly in order to successfully accommodate a broad range of operator weight. As a result the suspended seat assemblies were applicable for use where seat travel distance was not restricted.

Suspended seat assemblies are particularly suited for use on vehicles where the suspension system is relatively stiff and the terrain is rough. Suspended seats respond to these rough vehicle motions and smooth out the ride for the occupant seated thereon. Typically, the seat will oscillate through a substantial number of cycles in a relatively short period of time resulting in premature wear and improper adjustment of the seat assembly. This is particularly evident in prior suspended seat assemblies which utilize complicated suspension systems having long links and a substantial amount of elevational seat travel.

The present invention is directed to overcoming one or more of the problems as set forth above.

DISCLOSURE OF THE INVENTION

In one aspect of the present invention, a suspended seat assembly is provided which includes a support frame having first and second spaced apart support members, a seat frame having first and second spaced apart sides positioned adjacent the first and second support members, respectively; a connecting apparatus pivotally secures the first side to the first support member and the second side to the second support member and permits elevational movement of the seat assembly between a first position spaced above the support frame, past said first and second support members, to a second position spaced below the support frame; a tie apparatus maintains the first and second sides at a preselected attitude relative to the respectively adjacent first and second support members and a biasing arrangement located adjacent one of the first and second sides and elevationally above the respectively adjacent one of said first and second support members biases the connecting apparatus and urges the support frame to the first position.

Therefore, the suspended seat assembly of the subject invention is compact, permits usage in applications wherein elevational movement is limited due to the ability to move past the seat frame to a location thereneath, reduces wear and frequent adjustment due to simple construction, and is able to accept a wide range of vehicle operator weights due to the position and geometry of the connecting apparatus, tie apparatus and resilient device.

BRIEF DESCRIPTION OF THE DRAWINGS

FIG. 2 is a diagrammatic top elevational view of the suspended seat assembly of FIG. 1 with portions broken away to show the suspension linkage and associated components; and FIG. 3 is a diagrammatic front elevational view of the seat assembly of FIG. 1 with portions broken away to show the transverse location of the suspension linkage and associated components.

BEST MODE FOR CARRYING OUT THE INVENTION

Figure 1:
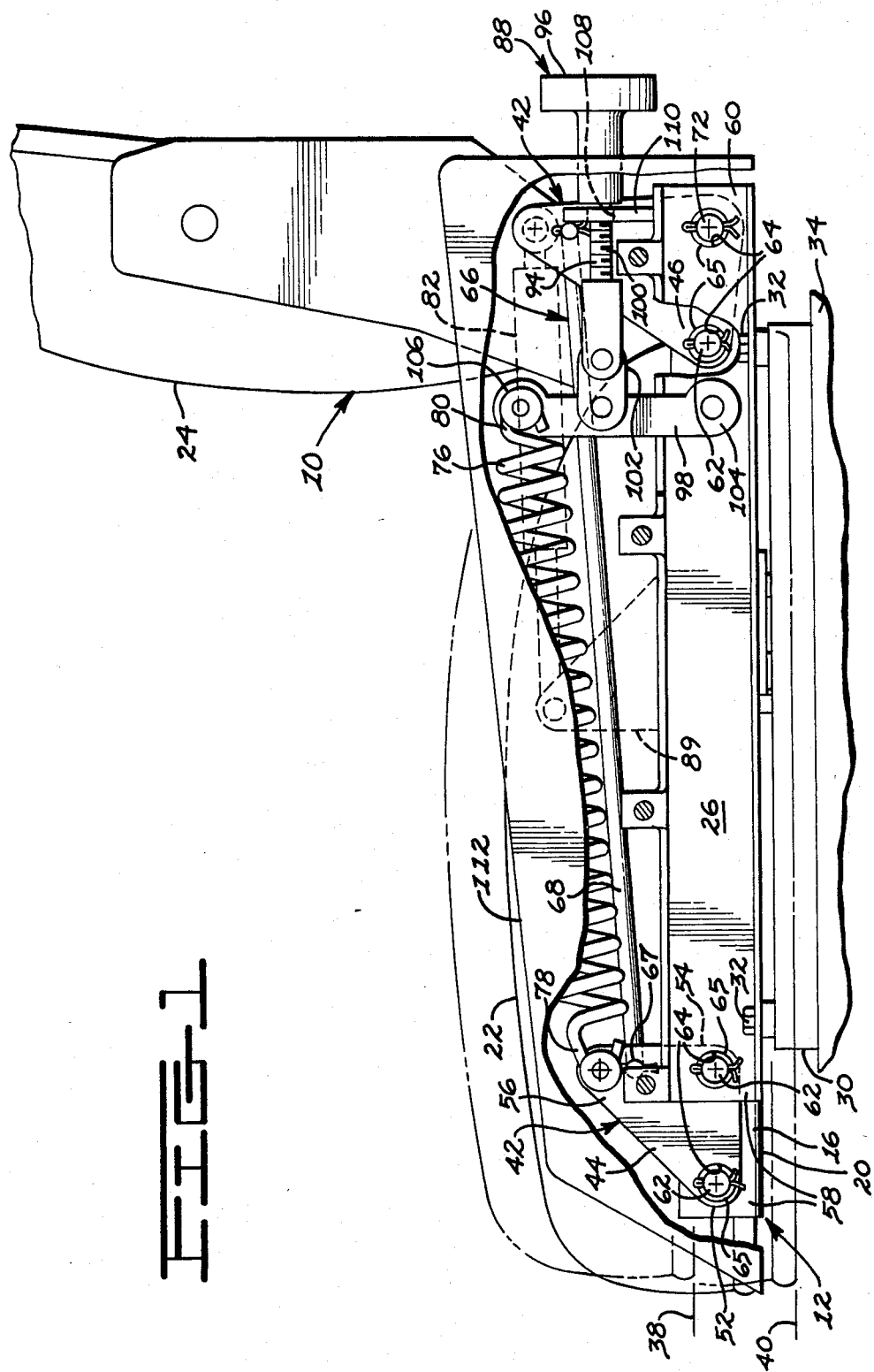
FIG. 1 is a diagrammatic side elevational view of an embodiment of the present invention showing the suspended seat assembly in solid lines at a mid elevational location in phantom lines at the fully raised and fully lowered positions, portions of the structure are broken away for better clarity.

With reference to the drawings, a suspended seat assembly 10 has a seat frame 12, and a support frame 14. The seat frame 12 has first and second spaced apart substantially parallel rectangular shaped elongate sides 16 and 18 and a rectangular shaped bottom portion 20. A seat cushion 22 of a conventional construction is positioned between the sides 16 and 18, supported on the bottom portion 20 and secured to the bottom portion in any suitable fashion, such as by threaded fasteners (not shown). A seat back 24 of a conventional well known construction is adjustably connected to the seat frame 12 and angularly positionable relative to the seat cushion to provide proper support for the back of an occupant seated on the cushion 22.

The support frame 14 has first and second spaced apart parallel elongate support members 26 and 28. These support members are connected to a pair of adjustable spaced apart rail assemblies 30 positioned therebeneath by fasteners 32. The rail assemblies 30 are secured to a portion of a vehicle 34, such as the prime mover top cover of a lift truck, in any suitable fashion. These rails provide fore-aft adjustable movement of the seat assembly relative to and along a longitudinal center line 36 of the vehicle so as to permit proper orientation of the operator seated thereon relative to the controls of the vehicle. The first support member 26 is positioned closely adjacent the first side 16 and the second support member 28 is positioned closely adjacent the second side 18. Both sides 16 and 18 are located transversely between the first and second support members 26 and 28 so as to permit elevational movement of at least portion of the seat assembly 10, i.e.; sides 16 and 18, between a first location 38 spaced elevationally above the first and second support members 26 and 28, past the support frame 14 to a second location 40 spaced elevationally below the support member 26 and 28.

A connecting apparatus 42 is provided for pivotally connecting the first side 16 to the first support member 26 and the second side 18 to the second support member 28 and permitting elevational movement of the seat frame 12 between the first location 38 and the second location 40. The connecting apparatus 42 has first, second, third and fourth support links 44, 46, 48 and 50 which are preferably triangular shaped bellcranks of plate steel. The links each have first, second and third spaced apart end portions 52, 54 and 56. The first and second links 44 and 46 are positioned between the first side 16 and the first support member 26 and pivotally connected at the first end portion 52 thereof to the first side 16 at spaced apart locations on the first side 16 and pivotally connected at the second end portion 54 thereof to the first support member 26 at spaced apart locations on the first support member 26. The third and fourth links 48 and 50 are positioned between the second side 18 and the second support member 28 and pivotally connected at the first end portion 52 thereof to the second side 18 at spaced apart locations on the second side 18 and pivotally connected at the second end portion 54 thereof to the second support member 28 at spaced apart locations on the second support member 28. Preferably, the spaced apart locations on the first and second support and side members 26, 28, 16 and 18 are front 58 and rear 60 end portions of those members.

A pivot pin 62 is connected to the first and second end portion 52 and 54 of each link 44, 46, 48 and 50 and rotatably disposed in an aperture 64 located at the front and rear end portions 58 and 60 of the first and second side and support members 16, 18, 26 and 28. A bushing 65 is provided between the pivot pin 62 and aperture 64 of the first and second end portions 52 and 54 of each link 44, 46, 48 and 50.

A tie apparatus 66 controllably maintains the first and second sides 16 and 18 at a preselected attitude relative to the respectively adjacent first and second support members 26 and 28. The tie apparatus 66 preferably maintains the sides 16 and 18 parallel to the support members 26 and 28 throughout the range of elevational movement of the seat assembly 10. Specifically, the tie apparatus 66 includes a first 68 and a second 70 tie rod each having opposite ends 67 and 69.

The first tie rod 68 extends between the first and second links 44, 46 and is connected at one end portion 67 to the third end portion 56 of the first link 44 and at the other end portion 69 thereof to the second link 46 at a predetermined location between the second and third end portions 54 and 56 thereof. The second tie rod 70 extends between the third and fourth links 48 and 50 and is connected at one end portion 67 thereof to the third end portion 56 of the third link 48 and at the other end portion 69 thereof to the fourth link 50 at a predetermined location between the second and third end portions 54 and 56 thereof. These tie rods synchronize movement of the first and second links and movement of the third and fourth links so that pivotal movement of any one of the links will result in an equal amount of pivotal movement of its associated interconnected link.

The tie apparatus 66 also includes a cross shaft 72 securely connected at opposite spaced apart end portions 71 and 73 thereof to the second end portion 54 of the second and fourth links 46,50, respectively, extends transversely between the first and second 26,28 support members and is pivotally connected at opposite end portions thereof to the rear end portion 60 of the first and second support members 26,28, respectively. The cross shaft 72 maintains the second and fourth links 46 and 50 at a preselected attitude relative to one another so that pivotal movement of either link results in an equal amount of pivotal movement of the other. It is to be noted that the seat assembly 10 is elevationally spaced above the cross shaft 72 at the first position 38 of the seat frame 12 and movable past the cross shaft 72 to the second position in response to pivotal movement of the links 44,46,48,50. It can thus be seen that the tie rods 68 and 70 and the cross shaft 72 are all interconnected so that pivotal motion of any one link results in an equal amount of pivotal movement of all links in the same direction. It should be noted that the cross shaft 72 as presented herein also serves as the pivot pin since it pivotally connects the second end portion 54 of the second and fourth links to the rear end portion 60 of the support members 26 and 28.

A biasing arrangement 74 cooperates with the connecting apparatus 42 and urges the seat frame 12 to the first elevational location 38. The biasing arrangement 74 is located adjacent at least one of the first and second sides 16 and 18 and elevationally above a respectively adjacent one of said first and second support members 26 and 28. The biasing arrangement 74 preferably includes a tension spring 76 having opposite end portions 78 and 80 and a linear gas spring 82 having a rod 84 slidably disposed in a cylinder 86 and biased to extend from the cylinder 86. One end portion 78 of the tension spring 76 is connected to the third end portion 56 of the first link 44 and the other end portion 80 of the tension spring 76 is connected to the first support member 26 via an adjustable connecting apparatus 88. The cylinder 86 of the gas spring 82 is connected to the third end portion 56 of the fourth link 50 and the rod 84 is connected to the second support member 28 via bracket 89. It is to be noted that the connections of the tension spring 76 and gas spring 82 heretofore discussed are preferred, however, connection to other links would be appropriate provided the springs 76 and 82 do not pass between the support and seat frames 12 and 14 and the seat cushion 22.

The links 44, 46, 48 and 50, springs 76 and 82 and tie rods 68 and 70 are located substantially outboard of the seat frame 12 so as to permit the seat frame 12 to pass the support frame 14 and thereby reduce the magnitude of elevational movement above the support frame 14.

The springs 76 and 82 are preferably oriented substantially parallel to the longitudinal centerline 36 of the seat assembly 10, elevationally above the respectively adjacent first and second support members 26,28 and substantially between a plane 90 projection vertically from the respectively adjacent ones of the first and second sides 16 and 18 and a plane 92 projecting vertically from the respectively adjacent ones of the first and second support members 26,28. Thus, the tie rods 68 and 70, springs 76 and 82 and connecting links 44, 46, 48 and 50 assume a low, compact profile outboard of the seat frame 12.

The adjustable connecting apparatus 88 provides the function of selecting the range of operator weight which the suspended seat assembly 10 will comfortably and effectively support. The connecting apparatus 88 connects the other end portion 80 of the spring 76 to the first support member 26 and controls the amount of force applied to the first link 44. The adjustable connecting apparatus 88 includes an adjustment rod 94, a handle 96 and a pivot lever 98. The adjustment rod 94 has a threaded end portion 100 and connecting link end portion 102. The pivot lever 98 has a first end portion 104 pivotally connected to the first support member 26 and a second end portion 106 hookingly connected to the other end portion 80 of said tension spring 76. The connecting link end portion 102 is connected to the pivot lever 98 and the threaded end portion 100 is slidably movably disposed in an aperture 108 of a flange 110. The flange 110 is securely connected to the first support member 26. Handle 96 is screwthreadably mounted on the threaded end portion 100 and movable therealong into forceable contact with the flange 110 for adjusting the tension spring 76. It is to be noted that the adjustable connecting apparatus 88 is located outboard of the seat frame 12 is compact, has a low profile, and does not interfere with elevational movement of the seat frame 12 past the support frame 14.

A first and second shroud 112 and 114 of preferably a nonmetallic plastic material is positioned in a covering relationship with the connecting apparatus 42, tie apparatus 66, biasing arrangement 74 and adjustable connecting apparatus associated with the first and second support frames respectively. The first shroud is secured to the first support member 26 by fasteners 116 and the second shroud is secured to the second support member 28 by fasteners 118.

Industrial Applicability

In operation and with reference to the drawings, the suspended seat assembly 10 in an unloaded unoccupied condition will be positioned at the fully raised first elevational location 38. At this location the suspension links 44,46,48,50 first end portion 52, and at least a portion of the seat frame 12, will be located elevationally above the support frame 14 and the force applied to the connecting apparatus 42 by the gas and tension springs 82 and 76 will be at a minimum.

Upon occupancy of the seat assembly by a vehicle operator, the links 44, 46, 48 and 50 will each pivot, under the influence of the occupant's weight, about their first and second end portion 52 and 54 in unison, clockwise, to a mid-location (as shown in FIG. 1) elevationally spaced below the first elevational location 38 but above the second elevational location 40. At this mid-location, the force applied by the tension spring 76 and gas spring to the connecting apparatus will be adequate to offset the weight applied to the seat 22, i.e. the system will be in equilibrium. It is to be noted that at this mid-location the seat cushion 22 and seat frame 12 are located between the first and second support members 26,28. Movement of the connecting apparatus in unison is maintained by the tie apparatus 66 so that the attitude of the seat cushion 22 and seat frame 12 remains constant relative to the support frame 14 throughout the range of movement of the seat frame 12.

Due to the large range of occupant's weight possible the adjustable connecting apparatus 88 is provided to vary the range and therefor accommodate substantially all weights. To adjust the suspended seat assembly 10, to a mid-location, for a given operator weight the operator must rotate the handle 96 in either a clockwise direction to increase the spring tension or in a counterclockwise direction to decrease the spring tension while seated on the seat cushion 22. It is desirable to have the seat in the mid-location when occupied and under static vehicle conditions so that the seat suspension is not too stiff or soft. Under dynamic conditions of vehicle operation, the seat assembly 10 being at the mid-location allows movement up and down and thereby dampens shock and isolates the operator from vehicle motion. It is to be noted that the amount of movement of the seat frame 12 is kept to a minimum, due to the geometry, size, location, and interconnection of the connecting apparatus 42, tie apparatus 66 and biasing arrangement 74.

The gas spring 82 in addition to providing a suspension spring force acts as a shock absorber and dampens the elevational motion of the seat assembly due to its connection with the connecting apparatus 42 and the support frame 14.

Thus, the suspension seat assembly 10 of the subject invention, provides superior suspension characteristics, permits use in vehicle applications wherein overhead clearance is limited due to the ability of the seat frame 12 to move to the second position 40, is compact, has a low profile, is easily adjustable to accommodate different weight ranges and is simple in construction so as to reduce wear and premature failure.

Other aspects, objects and advantages of the invention can be obtained from a study of the drawings, the disclosure and appended claims.

We claim:

1. In a suspended seat assembly (10) having a seat frame (12) and a support frame (14), said seat frame (12) having first and second spaced apart sides (16,18) and said support frame (14) having first and second spaced apart support members (26,28); said first side (16) and first support member (26) being adjacent one another, and said second side (18) and second support member (28) being adjacent one another; the improvement comprising:

means (42) for pivotally connecting said first side (16) to said first support member (26) and said second side (18) to said second support member (28) and for permitting elevational movement of said seat frame (12) between a first position (38), at which at least a portion of said seat frame (12) is elevationally spaced above said first and second support members (26,28), past said support frame (14) and to a second position (40) at which at least a portion of said seat frame (12) is located elevationally below said first and second support members (26,28), said pivotal connecting means including first, second, third and fourth support links (44,46,48,50), said first and second links (44,46)

being pivotally connected to said first side (16) at spaced apart locations and pivotally connected to said adjacent first support member (26) at spaced apart locations, and said third and fourth links (48,50) being pivotally connected to said second side (18) at spaced apart locations and pivotally connected to said adjacent second support member (28) at spaced apart locations;
means (66) for maintaining the first and second sides (16,18) at a preselected attitude relative to the respectively adjacent first and second support members (26,28); and
means (74) for biasing said pivotal connecting means (42) and urging said seat frame (12) to said first position (38), said biasing means (74) includes a first resilient member (76) connected to one of said links (44,46,48,50) and an adjacent one of said first and second support members (26,28), said first resilient member (76) being spaced outwardly from the adjacent one of said first and second sides (16,18), elevationally above the adjacent one of said first and second support members (26,28), and substantially between a plane (90) extending vertically from the adjacent side (16,18) and a plane (92) extending vertically from the adjacent support member (26,28).

2. The suspended seat assembly (10) as set forth in claim 1 wherein said first, second, third and fourth support links (44,46,48,50) are bellcranks each having first, second and third spaced apart end portions (52,54,56), said first and second bellcranks (44,46) being positioned between the first side (16) and said first support member (26) and said third and fourth bellcranks (48,50) being positioned between the second side (18) and second support member (28), said bellcranks first end portion (52) being pivotally connected to said seat frame (12) and said bellcranks second end portion (54) being pivotally connected to said support frame (14).

3. The suspended seat assembly (10) as set forth in claim 2 wherein said first and second sides (16,18) each have front and rear end portions (58,60) and said first and second support members (26,28) each have front and rear end portions (58,60);
said first bellcrank (44) first end portion (52) being pivotally connected to the front end portion (58) of said first side (16) and said first bellcrank (44) second end portion (54) being pivotally connected to the front end portion (58) of said first support member (26);
said second bellcrank (46) first end portion (52) being pivotally connected to the rear end portion (60) of said first side (16) and said second bellcrank (46) second end portion (54) being pivotally connected to the rear end portion (60) of said first support member (26);
said third bellcrank (48) first end portion (52) being pivotally connected to the front end portion (58) of said second side (18) and said third bellcrank (48) second end portion (54) being pivotally connected to the front end portion (58) of said second support member (28); and
said fourth bellcrank (50) first end portion (52) being pivotally connected to the rear end portion (60) of said second side (18) and said fourth bellcrank (50) second end portion (54) being pivotally connected to the rear end portion (60) of the second support member (28).

4. The suspended seat assembly (10) as set forth in claim 1 wherein said means (66) for maintaining includes:
a cross shaft (72) for rigidly connecting said second and fourth links (46,50) to each other and maintaining said first and second sides (16,18) and said first and second support members (26,28) substantially parallel one to another.

5. The suspended seat assembly (10) as set forth in claim 3 wherein said means (42) for pivotally connecting includes:
an aperture (64) disposed in front and rear end portions (58,60) of said first and second sides (16,18) and said first and second support members (26,28), and a pivot pin (62) connected to the first and second end portions (52,54) of each bellcrank (44,46,48,50), said pivot pins (62) being rotatably disposed in said apertures (64).

6. The suspended seat assembly (10) as set forth in claim 1 wherein said means (74) for biasing includes;
a second resilient member (82) connected to another of said links (44,46,48,50) and an adjacent one of said first and second support members (26,28), said second resilient member (82) being spaced outwardly from an adjacent one of said first and second sides (16,18), elevationally above an adjacent one of the first and second support members (26,28) and between a plane (90) extending vertically from the adjacent side (16,18) and a plane (92) extending vertically from the adjacent support member (26,28).

7. The suspended seat assembly (10) as set forth in claim 6 wherein said first resilient member (76) is a tension spring and said second resilient member (82) is a linear gas spring, said tension spring (76) having opposite end portions (78,80) and being connected at one end portion (78) to one of the first and third links (44,48) and at the other end portion (80) to an adjacent one of the first and second support members (26,28), said linear gas spring (82) having a rod (84) and a cylinder (86), said rod (84) being connected to one of the second and fourth links (46,50) and said cylinder (86) being connected to an adjacent one of said first and second support members (26,28).

8. The suspended seat assembly (10) as set forth in claim 1 wherein said first resilient member (76) is a tension spring having opposite end portions (78,80) and being connected at one end portion (78) to the first link (44) and including:
means (88) for adjustably connecting the other end portion (80) of said tension spring (76) to said first support member (26) and controlling the spring force applied to the first link (44).

9. The suspended seat assembly (10) as set forth in claim 8 wherein said first support member (26) has a flange (110) having an aperture (108) therethrough and said means (88) for adjustably connecting includes;
an adjustment rod (94), and a handle (96), said adjustment rod (94) having a connecting link end portion (102) and a threaded end portion (100), said connecting link end portion (102) being connected to the other end portion (80) of the tension spring (76) and the threaded end portion (100) being disposed in the aperture (108) of said flange (110), said handle (96) being mounted on the threaded end portion (100) and adjustably movable therealong into forceable contact with said flange (110).

10. The suspended seat assembly (10) as set forth in claim 2 wherein said first resilient member (76) is a tension spring and said means for biasing (74) includes:
a linear gas spring (82) having a rod (84) and a cylinder (86), said tension spring (76) having opposite end portions (78,80) and being connected at one of said end portions (78) to the third end portion (56) of one of said first and third bellcranks (44,48) and at the other end portion (80) to an adjacent one of said first and second support members (26,28), said linear gas spring (82) being connected at one of the rod (84) and cylinder (86) to the third end portion (56) of one of the second and fourth bellcranks (46,50) and at the other of the rod (84) and cylinder (86) to an adjacent one of the first and second support members (26,28).

11. The suspended seat assembly (10) as set forth in claim 10 wherein said linear gas spring (82) is spaced outwardly from an adjacent one of the first and second sides (16,18) and elevationally above an adjacent one of the first and second support members (26,28).

12. The suspended seat assembly (10) as set forth in claim 1 wherein said means (66) for maintaining includes:
a first tie rod (68) pivotally connected to each of the first and second links (44,46) and extending therebetween;
a second tie rod (70) pivotally connected to each of the third and fourth links (48,50) and extending therebetween; and
a cross shaft (72) rigidly connected to the second and fourth links (46,50).

13. The suspended seat assembly (10) as set forth in claim 12 said cross shaft (76) has first and second end portions (71,73) and said first and second support members (26,28) each have a rear end portion (60), said cross shaft first end portion (71) being rotatably connected to the rear end portion (60) of said first support member (26) and said cross shaft second end portion (73) being rotatably connected to the rear end portion (60) of said second support frame (28), said seat frame (12) being elevationally spaced above said cross shaft (72) at said first position (38) and movable past said cross shaft (72) to said second position (40) in response to pivotal movement of said links (44,46,48,50).

14. The suspended seat assembly (10) as set forth in claim 12 wherein said first and second support members (26,28) each have a rear end portion (60) and said cross shaft (72) extends between said first and second support members (26,28) and pivotally connects the second and fourth links (46,50) to the rear end portion (60) of said support members (26,28).

15. The suspended seat assembly (10) as set forth in claim 2 wherein said means (66) for maintaining includes:
a first tie rod (68) having opposite end portions (67,69) and being pivotally connected at one end portion (67) to the third end portion (56) of said first bellcrank (44) and at the other end portion (69) to the second bellcrank (46) at a location between the second and third end portions (54,56) thereof;
a second tie rod (70) having opposite ends (67,69) and being pivotally connected at one end portion (67) to the third end portion (56) of said third bellcrank (48) and at the other end portion (69) to the fourth bellcrank (50) at a location between the second and third end portions (54,56) thereof; and
a cross shaft (72) rotatably connected to said first and second support members (26,28) and extending transversely therebetween, said second and fourth bellcranks (46,50) being rigidly mounted on said cross shaft (72) at spaced apart locations thereon, said second and fourth bellcranks (46,50) being pivotally movable in unison in response to rotational movement of said cross shaft (72).

16. The suspended seat assembly (10) as set forth in claim 6 wherein said means for maintaining (66) includes:
a first tie rod (68) pivotally connected to each of the first and second links (44,46) and extending therebetween;
a second tie rod (70) pivotally connected to each of the third and fourth links (48,50) and extending therebetween; and
a cross shaft (72) being rotatably connected to said first and second support members (26,28) and extending therebetween, said second and fourth links (46,50) being rigidly connected to said cross shaft (72) at spaced apart locations (71,73) thereon, said second and fourth links (46,50) being pivotally movable in unison in response to rotational movement of said cross shaft (72).

17. The suspended seat assembly (10) as set forth in claim 1 including:
a vehicle (34), said support frame (14) being connected to said vehicle (34).

18. A suspended seat assembly (10); comprising:
a support frame (14) having first and second spaced apart support members (26,28);
a seat frame (12) having first and second spaced apart sides (16,18) and being disposed between said first and second support members (26,28);
means (42) for pivotally connecting said first side (16) to said first support member (26) and said second side (18) to said second support member (28) and for guiding elevational movement of said seat frame (12) between first and second elevationally spaced apart positions (38,40);
means (66) for maintaining the first and second sides (16,18) at a preselected attitude relative to the respectively adjacent first and second support members (26,28); and
a first resilient member (76) connected to said pivotal connecting means (42) and one of said first and second support members (26,28) and biasing said seat frame (12) toward said first position (38), said first resilient member (76) being spaced outwardly from an adjacent one of said first and second sides (16,18), elevationally above said one support member (26,28), and substantially between a plane (90) extending vertically from the adjacent sides (16,18) and a plane (92) extending vertically from said one support member (26,28).

* * * * *